July 17, 1951  O. E. ROSS  2,561,293

ELECTRICALLY OPERATED LAWN MOWER

Filed Nov. 10, 1949

Inventor
ORRIN E. ROSS

By Ralph B. Stewart

ATTORNEY

Patented July 17, 1951

2,561,293

UNITED STATES PATENT OFFICE 2,561,293

ELECTRICALLY OPERATED LAWN MOWER

Orrin E. Ross, Massapequa, N. Y.

Application November 10, 1949, Serial No. 126,560

7 Claims. (Cl. 56—25.4)

This invention relates to lawn mowers of the electrically operated type.

An object of the invention is to devise an electrically operated lawn mower of simple construction and one which requires no special skill in operation.

One feature of my invention is the provision of a reversible handle for pushing the mower in either direction without turning the whole machine around at the end of a cutting row.

Another feature of the invention is a novel arrangement for leading in the supply conductors to the driving motor through a hollow handle which permits the handle to be moved in either direction without disturbing the connection to the motor and which protects the supply connection from injury by the cutting blades.

A further feature of the invention is an arrangement for winding the electric cord upon the handle of the mower to store the cord when the mower is not being used.

Still another feature is the construction of the handle and the electric cord in a unitary structure which may be easily removed from the mower to facilitate storage or transportation of the mower.

Still another feature or object of the invention is the arrangement of a movable guard secured to the reversible handle of the mower and being shifted by the handle, in either direction of operation, to move the guard into a position to protect the feet of the user of the mower against injury by the rotating cutters of the mower.

Other objects or features of the invention will become apparent from the description which follows.

Figure 1:
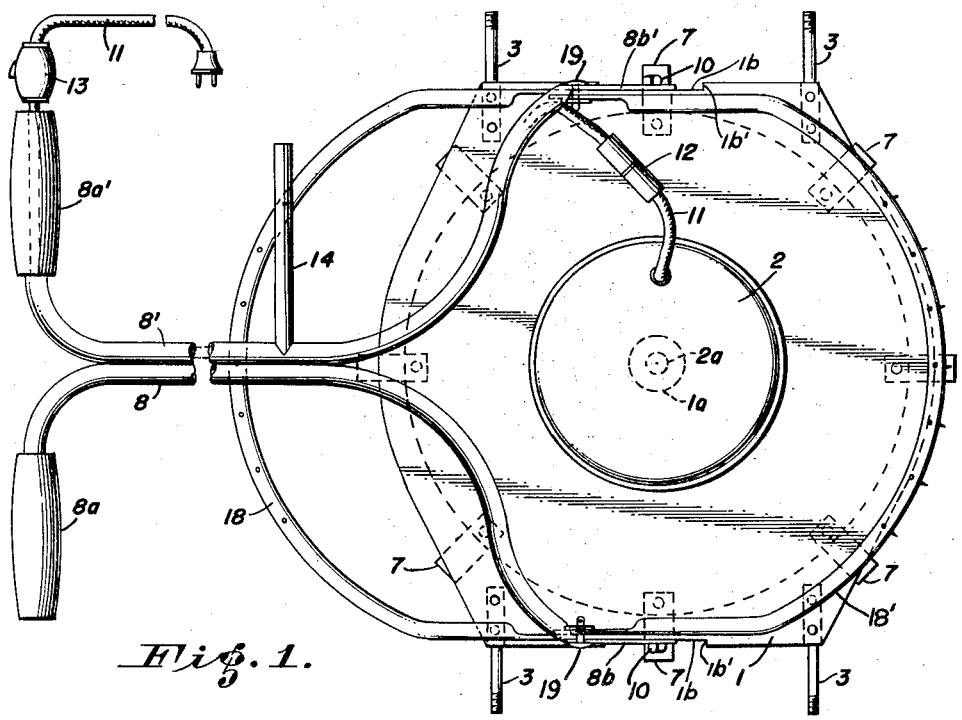
Figure 2:
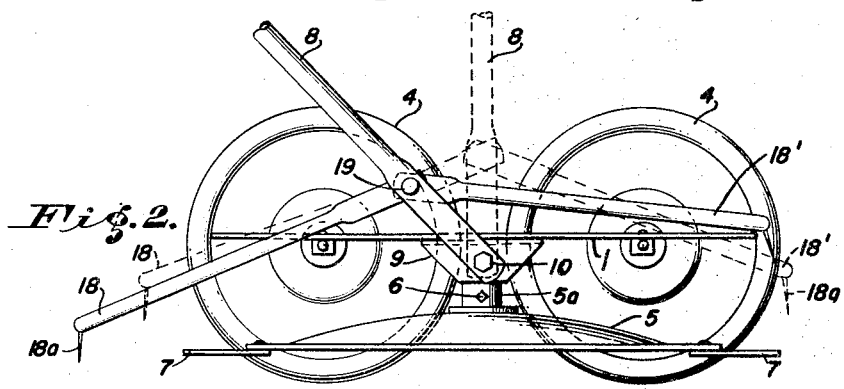
Figure 3:
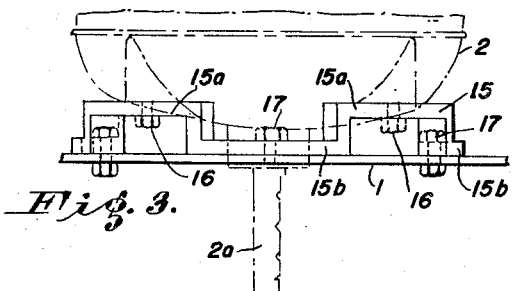

The preferred embodiment of my invention is illustrated in the accompanying drawing in which Figure 1 is a plan view of the mower with the supporting wheels being removed;

Figure 2 is a side elevational view of the mower with the driving motor removed and the wheels on the near side being removed for illustrating the manner of mounting the reversible handle and the movable guard which is operated by the handle; and Figure 3 is an elevational view illustrating one arrangement for mounting the driving motor upon the body plate of the mower.

Referring to the drawing, the mower structure is assembled upon a body plate or platform 1 which preferably is formed of a non-corrosive metallic plate of uniform thickness throughout. The plate 1 is provided with straight parallel sides and rounded ends as shown in Figure 1. A driving motor 2 is mounted on top of the plate 1 with its axis vertical, and the shaft 2a of the motor extends downwardly through a central opening 1a in the plate 1. Four wheel axles 3 are secured to the respective corners of the plate 1 as shown in Figure 1, and these axles serve to support the plate 1 above the ground by means of four wheels 4 mounted upon the axles. Preferably these wheels are of the ball-bearing, rubber-tired type. The two axles of any aligned pair may be formed on the opposite ends of a single shaft extending entirely across the plate 1, but I prefer to form each axle on separate stub-shaft secured on the underside of the plate 1 as by riveting or otherwise.

The cutting arrangement of the mower includes a rotary disk 5 having a domed central portion and a flat peripheral portion. This disk is mounted for rotation by the motor 2, the motor shaft extending into the disk hub 5a. The disk 5 is secured to the shaft 2a of the motor by means of a set screw 6 threaded in the hub 5a and arranged to enter one or more notches formed in the motor shaft 2a as shown in Figure 3. By this arrangement, the disk 5 may be mounted at different elevations above the ground, and in this way the height of the cut may be varied. The cutting elements of the mower comprise a number of cutting blades 7 pivotally supported at one end on the flat peripheral portion of the disk 5 and having their forward edges sharpened to act as cutting blades upon rotation of the disk. By pivotally supporting the blades 7 at one end, centrifugal action on the blades will maintain them normally in a radial position, but the blades are free to swing backward from a radial position in case they strike a rigid object such as a stone. In this way, the blades are protected from serious injury. As shown in the drawing, the blades are all alike and are of a length less than the radius of the disk 5 and less than one-half the distance between the pivotal axes of adjacent blades, so that each blade is free to swing a complete revolution about its own pivotal axis without interference from adjacent blades.

The handle for the mower is preferably formed of two tubular pieces 8 and 8' joined together, as by welding, along the major part of their length. The end portions of the tubular members 8 and 8' are bent outwardly in opposite directions in smoothly curved bends to form handle portions which carry grip elements 8a and 8a'. The end portions on the other end of tubular members 8 and 8' are bent outwardly in opposite directions to form a fork for pivotal attachment to opposite sides of the body plate 1. As shown in the drawing, the terminal portions of the two arms of the fork are flattened to form two parallel portions 8b and 8b', and these terminal portions are pivotally secured to brackets 9 mounted on opposite sides of the body plate 1. The pivotal connection may be formed of bolts 10 passing through the arm portions 8b and 8b' and secured to the brackets 9. The supporting brackets 9 may be formed integrally with the body plate 1, or they may be formed of separate angle pieces as shown in the drawing, one flange of each angle piece being secured to the underface of the plate 1 and the other flange extending vertically downward.

The mounting brackets 9 are mounted at the center of the side edges of the body plate 1, and the fork at the lower end of the handle has a span sufficiently wide to permit the handle to be moved from one operating position as shown in Figure 1 to the opposite operating position. By this arrangement, it is possible to operate the mower in either direction without bodily turning the mower around.

The electric motor 2 is supplied with operating current from a suitable source through a flexible cord 11 which includes a quick detachable connector 12 adjacent the motor and a controlling switch 13. For the purpose of protecting the cord 11 against injury by the cutter blades, and for the further purpose of arranging the control switch 13 convenient to the grip portions of the handle, I prefer to pass the electric cord 11 through one of the tubular members of the handle, and the switch 13 is located adjacent the outer end of the grip piece of the handle tube through which the cord passes. The lower end of the cord 11 is connected to the motor 2 through the detachable connector 12. By this arrangement, there is no possibility of the cord 11 becoming entangled with the supporting wheels, or with the cutter blade, when the handle is shifted from one operating position to the other. As shown in the drawing, all bends in the handle members are of large radius with respect to the diameter of the tubular member, and this facilitates the threading of the cord through the handle part.

For the purpose of storing the electric cord when the mower is not in use, I provide a laterally extending arm 14 on one of the tubular members forming the operating handle, for example, the arm may be mounted on the tubular member 8' as shown in Figure 1. The cord is stored by winding the cord around the arm 14 and around the grip element 8a'. By making the arm 14 as a straight arm, the cord may be quickly uncoiled by slipping the turns of the cord over the end of the arm 14.

For the purpose of avoiding possible electric shock to the operator of the mower, the motor 2 should be insulated from the body plate 1. Suitable insulating arrangements will readily occur to those skilled in the art, but one possible arrangement is shown in Figure 3. In this arrangement, the motor 2 is supported upon the body plate 1 by a ring 15 which has alternate sectors located in spaced planes. For example, sectors 15a are located in the upper plane and sectors 15b are located in the lower plane. The motor 2 is secured to the ring 15 by suitable bolts 16 passing upwardly through the sectors 15a and the ring 15 is secured to the plate 1 by bolts 17 passing downwardly through the sectors 15b. It will be understood that the ring 15 is formed of suitable insulating material such as hard rubber, vulcanized fiber, or molded thermosetting plastic.

For the purpose of protecting the operator of the mower from possible injury to his feet by the rotating cutter blades, a safety guard is provided which extends downwardly between the operator and the rotating cutter blades in either direction of operation of the mower. As shown in Figures 1 and 2 of the drawing, this safety guard is formed of two U-shaped elements 18 and 18' having their ends flattened in a vertical plane and are pivotally connected to the forked arms of the handle at a point removed from the pivot bolts 10. As shown in Figure 2, the guards 18 and 18' are pivotally connected to the tubular handle members by means of suitable bolts or rivets 19, and these pivotal connections are located above the body plate 1. The guards 18 and 18' normally rest upon the rounded end edges of the body plate, and when the operating handle of the mower is moved in either direction from its vertical position, one of the guards will be lowered while the other guard will be raised. This is illustrated in Figure 2 where the handle is shown in dotted lines in the vertical position, and in this position the two guards extend over the ends of the plate 1 by equal amounts. When the handle is moved for operation of the mower to the right, as shown in Figure 2, the guard 18 is moved by the handle to a position where it extends downwardly and to the rear of the plate 1 and in a position to protect the feet of the operator from the rotating blade 7. At the same time, the guard 18' is pulled backwardly by the handle 8 and rides up on the front end of the plate 1 so that it does not interfere with the cutting operation of the mower. If desired, each of the guards 18 and 18' may be provided with downwardly extending fingers 18a secured to the guard members at spaced points around its curved portion to provide additional protection against the operator's foot being entered beneath the guard.

As shown in Figure 1, the flattened end portions 8b and 8b' of the handle are positioned in shallow, relatively long notches 1b formed in the side edges of body plate 1, and the end walls 1b' of these notches form stops for the forked arms of the handle to prevent the handle from dropping below the position shown in solid lines in Figure 2. Also, these stops provide means for tilting the body plate 1 backward when it is desired to cut low growing weeds at their roots. When the mower carriage is tilted in this way, the cutting blades at the rear of the mower move closer to the ground and may be made to cut into the ground. This is made possible by the fact that the front and rear pairs of wheels are spaced close together so that the cutting blades 7 extend beyond the axes of the two pairs of supporting wheels as shown in Figure 2.

It may also be noted that all four supporting wheels for the carriage of the mower are of the same size and are located at equal distances fore and aft of the transverse center line, and this arrangement provides better maneuverability of the mower since in either operating position of the handle 8, the front wheels may be raised off of the ground by pressing down on the handle, and the mower may then be maneuvered in any desired direction.

What I claim is:

1. A lawn mower comprising a wheeled carriage, a cutter supported on said carriage and mounted for rotation beneath said carriage, a handle having a forked end pivotally connected to said carriage on opposite sides thereof and being swingable to the front and rear of said carriage, whereby said carriage may be pushed in either direction without turning the carriage around, and a pair of U-shaped guard members arranged one to the front and one to the rear of said handle and having their ends pivotally connected to the forked arms of said handle at a point removed from the pivotal axis of said handle, said guard members being arranged normally to rest upon said carriage, whereby when said handle is moved from one operating position to the other, both of said guard members are moved rearwardly with respect to the direction of movement of the mower.

2. A mower according to claim 1 wherein the parts of said carriage which support said guard members are shaped to effect lowering of the loop portion of each guard when it moves beyond the end of said carriage.

3. A lawn mower comprising a wheeled carriage, a cutter supported on said carriage and mounted for rotation beneath said carriage, a handle having a forked end pivotally connected to said carriage on opposite sides thereof and being swingable to the front and rear of said carriage, whereby said carriage may be pushed in either direction without turning the carriage around, and a pair of U-shaped guard members arranged one to the front and one to the rear of said handle and having their loop portions positioned to guard the said cutter at the front and rear of said carriage, and means connecting said handle to said guard members for raising the front guard member and lowering the rear guard member when said handle is moved from a vertical position to either one of the operating positions.

4. A lawn mower according to claim 3 wherein each U-shaped guard member is provided with downwardly extending fingers secured to the member at spaced points around the loop portion of the member.

5. A lawn mower comprising a wheeled carriage, a cutter supported on said carriage and mounted for rotation beneath said carriage, an electric motor mounted on said carriage and connected to drive said cutter, a handle having a forked end pivotally connected to said carriage on opposite sides of said motor and being swingable to the front and rear of said carriage, whereby said carriage may be pushed in either direction without turning the carriage around, said handle being formed of a tubular member, a supply cord for said motor entering said tubular member at the free end of said handle and leaving said tubular member adjacent the pivoted end of said handle, a pair of U-shaped guard members arranged one to the front and one to the rear of said handle and having their ends pivotally connected to the forked arms of said handle at a point removed from the pivotal axis of said handle, said guard members being arranged normally to rest upon said carriage, whereby when said handle is moved from one operating position to the other, both of said guard members are moved rearwardly with respect to the direction of movement of the mower.

6. A lawn mower comprising a wheel-supported body plate having parallel sides and rounded ends, an electric motor mounted upon said plate with its shaft extending vertically downward through an opening in said plate, a cutter disk mounted upon said motor shaft below said body plate and having a plurality of cutter blades pivotally secured to the peripheral portion thereof, an operating handle for said mower comprising a pair of tubular members secured together in parallel relation throughout the major portion of their length and having end portions thereof separated to form handle portions at the upper end thereof and a fork at the lower end thereof, means pivotally connecting the forked arms of said handle to said body plate on opposite sides of said motor, said handle being freely swingable to the front and rear of said motor whereby said carriage may be pushed in either direction without turning the carriage around, a supply cord for said motor entering one of said tubular members at the upper end of said handle and leaving said one tubular member adjacent the pivoted end of said handle and being connected to said motor, and a pair of U-shaped guard members arranged one to the front and one to the rear of said handle and having their ends pivotally connected to the forked arms of said handle at a point removed from the pivotal axis of said handle, said guard members being arranged normally to rest upon the curved ends of said body plate, whereby when said handle is moved from vertical position into either operating position, one guard member will be lowered and the other guard member will be raised.

7. A lawnmower comprising a carriage, two pairs of equal sized wheels supporting said carriage, one pair of said wheels being secured to said carriage at one end thereof on a common transverse axis, the second pair being secured to said carriage at the other end thereof on a common transverse axis, a cutter shaft mounted upon said carriage for rotation about a vertical axis midway between said wheel axes and extending below said carriage, a cutter secured to the lower end of said shaft for rotation therewith and including a plurality of cutting blades sweeping through a circular path, a handle having a forked end pivotally connected to said carriage on opposite sides of said cutter shaft and being swingable to the front and rear of said carriage whereby said carriage may be pushed in either direction without turning the carriage around, stop means on said carriage and positioned to engage the forked end of said handle and to support said handle in two oppositely inclined pushing positions at the two ends of said carriage, whereby in either pushing position of said handle the front set of wheels may be raised off of the ground by pressing the handle below the operating position determined by said stops, and said cutter blades having a sweep radius extending radially beyond the axes of said supporting wheels whereby when said handle is depressed below the normal pushing position, the path of movement of the cutting blades moves closer to the ground at the rear end of said carriage.

ORRIN E. ROSS.

REFERENCES CITED

The following references are of record in the file of this patent:

UNITED STATES PATENTS

| Number | Name | Date |
|---|---|---|
| 1,805,927 | Sharp | May 19, 1931 |
| 1,868,347 | Cloud | July 19, 1932 |
| 1,868,918 | Schenk | July 26, 1932 |
| 2,167,222 | Shelor | July 25, 1939 |
| 2,485,729 | Gentry | Oct. 25, 1949 |
| 2,502,696 | Barnes | Apr. 4, 1950 |
| 2,518,093 | Sutter | Aug. 8, 1950 |
| 2,523,439 | May | Sept. 26, 1950 |